United States Patent [19]

Stock

[11] Patent Number: 4,856,964
[45] Date of Patent: Aug. 15, 1989

[54] METHOD AND APPARATUS FOR BALANCING A TURBINE ROTOR

[75] Inventor: Alvin L. Stock, Casselberry, Fla.

[73] Assignee: Westinghouse Electric Corp., Pittsburgh, Pa.

[21] Appl. No.: 201,714

[22] Filed: Jun. 3, 1988

[51] Int. Cl.[4] .......................................... F04D 29/66
[52] U.S. Cl. ................................... 415/201; 415/119; 74/573 R
[58] Field of Search .................. 415/201, 119, 118; 416/144; 74/573 R

[56] References Cited

U.S. PATENT DOCUMENTS

| | | | |
|---|---|---|---|
| 2,308,897 | 1/1943 | Stearns | 415/201 |
| 3,362,160 | 1/1968 | Bourgeois | 415/201 |
| 3,985,465 | 10/1976 | Sheldon et al. | 416/144 |
| 4,730,979 | 3/1988 | Hook, Jr. | 415/118 |

FOREIGN PATENT DOCUMENTS

| | | | |
|---|---|---|---|
| 58-104 | 5/1979 | Japan | 415/118 |
| 987124 | 1/1983 | U.S.S.R. | 415/201 |

*Primary Examiner*—Robert E. Garrett
*Assistant Examiner*—John T. Kwon

[57] ABSTRACT

A method and apparatus for balancing a turbine rotor (10) is disclosed. The invention utilizes an existing equilibrium pipe (17) in the turbine, and changes the structure of the turbine in such a manner that the pipe (17) can be extended with a sleeve (17a), so that a linear passageway (21) is created from the turbine rotor (10), at a point where the rotor is to be balanced (11), to the exterior of the turbine (20). The sleeve (17a) is capped and plugged during operation of the rotor (10). To insert a balancing weight (25), the sleeve (17a) is uncapped and unplugged and the weight (25) is passed through the sleeve (17a) and positioned within the rotor (10).

7 Claims, 4 Drawing Sheets

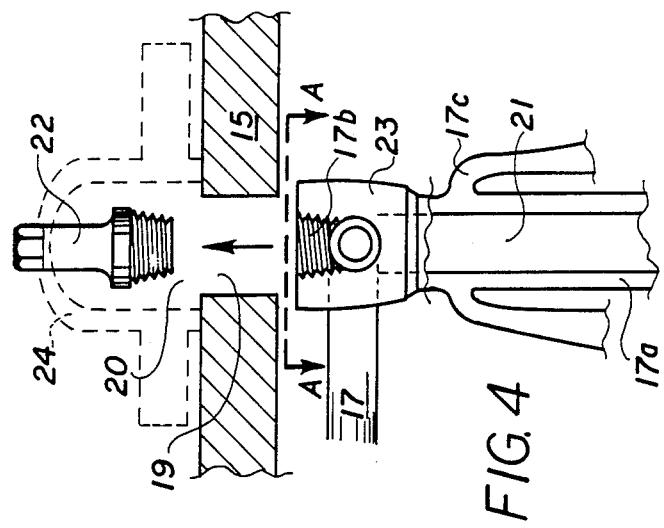
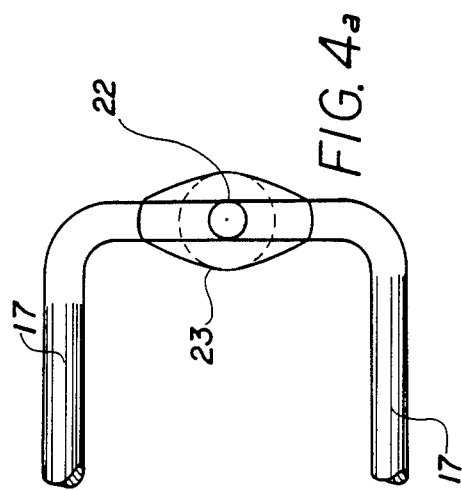

METHOD AND APPARATUS FOR BALANCING A TURBINE ROTOR

FIELD OF THE INVENTION

The present invention relates to methods and apparatus for balancing a turbine rotor.

BACKGROUND OF THE INVENTION

Turbine rotors used in power generating facilities must be balanced periodically to insure smooth, efficient operation of the rotor. This balancing is generally accomplished by inserting weights around the circumference of the rotor, the mass and exact position of the weight being dictated by the imbalance. Generally three circumferential planes of the rotor are made available for balancing, one on either end of the rotor, and one in the middle, known as the center plane balance.

Because of the time and expense involved in removing the turbine casing to access the rotor, means have been devised for inserting the weights while the casing is in place. The conventional means of accessing the rotor for center plane balancing consists of a cylindrical access port leading from the outside of the casing to the rotor. During operation, this port must be closed and plugged with seals at points along its length to prevent the bypass leakage of steam which would be detrimental to turbine efficiency. This port serves no purpose other than to allow center plane balancing. To use the port, the operator must open it and remove each of the sealing plugs. Further, balancing often requires more than one weight placement, or "balance move". After each balance move, however, the port must be replugged and closed so further balancing needs can be diagnosed. Lastly, balancing the rotor can be a "critical path" operation. Therefore, a design allowing for faster access to the rotor is desirable.

SUMMARY OF THE INVENTION

The present invention solves the above problems by modifying the turbine's existing equilibrium pipe, extending the pipe, thereby allowing the pipe to double as an access port for center plane balancing. The equilibrium pipe is attached to a sleeve which extends to the outer housing of the turbine, creating a passageway which allows direct access to the rotor from the exterior of the turbine. During operation of the turbine, the sleeve is plugged with the extremity of the plug projecting through the outer housing for ease of access. The extension of the plug through the outer housing is then capped.

Turbines of this type require an equilibrium pipe to balance pressures and thus thrust. The novel design of the present invention allows the use of the existing and necessary components to this equilibrium system to also perform the function of a center plane balance, eliminating the need for two separate systems and paths to the turbine rotor.

One advantage of this design is a one hour savings in time for each balancing move, and an additional saving in design cost. In addition the reliability of the machine is increased by not having as many separate parts (closures) to become loose, creating leakage and/or potential damage while the machine is running. Also, by combining the two functions into one, the axial length of the machine is reduced.

Other details, objects and advantages of the invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings, wherein:

FIG. 4 is a plan view illustrating the details of the plug used in connection with the present invention.

FIG. 4a is a sectional plan view of the illustration of FIG. 4, taken along the lines A—A.

DETAILED DESCRIPTION OF THE INVENTION

Figure 1:
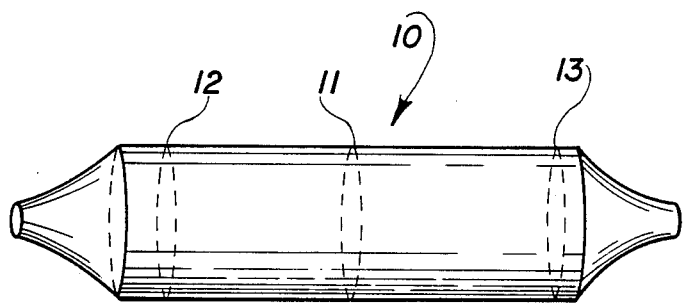
FIG. 1 is a schematic representation of a turbine rotor showing the approximate locations of balancing planes.

FIG. 1 is a schematic representation of a turbine rotor, generally 10, having a center plane 11 and two end planes 12 and 13. When a balancing weight is placed on the center plane 11, the weight is termed a center plane balance.

Figure 2:
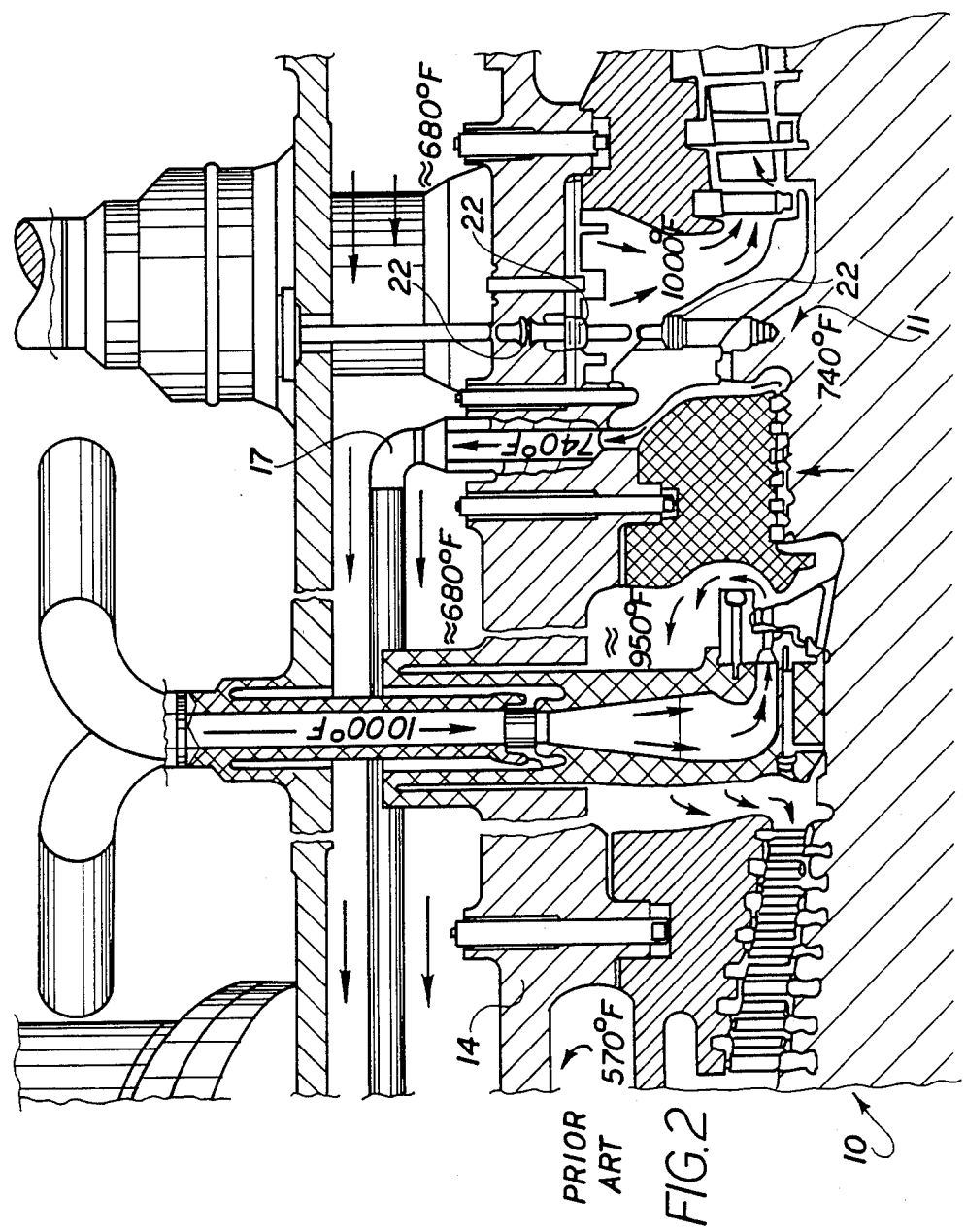
FIG. 2 is a sectional view of a turbine showing prior art positioning of the equilibrium tube and center plane balance.

FIG. 2 illustrates a cross sectional view of a conventional turbine, having a rotor 10 with a center plane balance 11. As shown, the conventional turbine has an equilibrium pipe 17, which extends to the rotor 10, in tortuous-path fashion. This pipe 17 is separate from the series of plugs 22 which are removed in order to gain access to the center plane balance 11.

Figure 3:
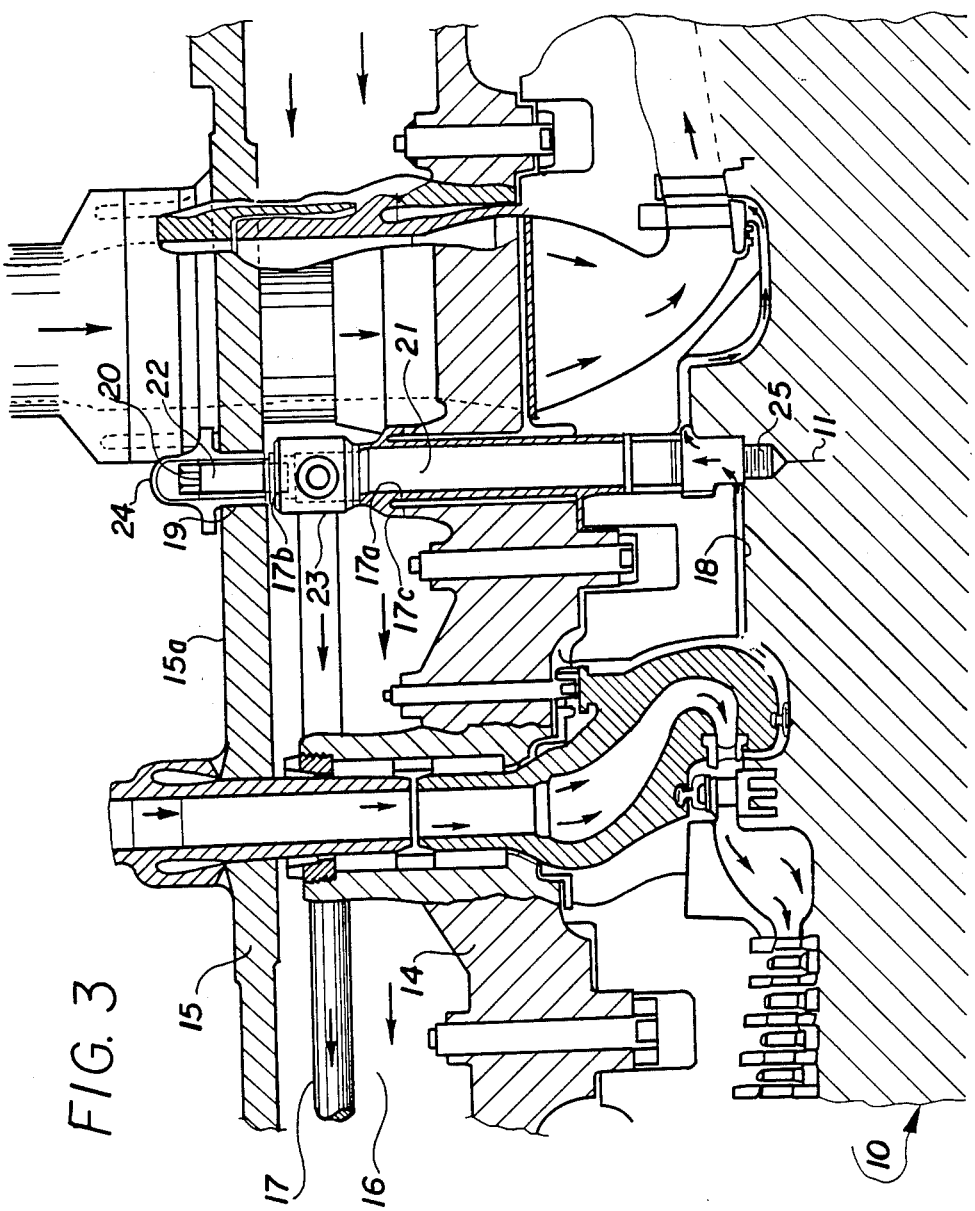
FIG. 3 is a sectional view of a preferred embodiment of the present invention.

A preferred embodiment of the apparatus used for practicing the present invention is illustrated in FIG. 3. As shown, the turbine rotor 10 is housed within an inner cylinder 14, and the inner cylinder 14 is housed within an outer housing 15 having an outer surface 15a. A gap 16 extends axially between the inner cylinder and outer housing 14 and 15, respectively.

A sleeve 17a extends substantially from the outer surface 18 of the turbine rotor 10 through the inner cylinder 14. As shown in FIGS. 4 and 4a, the sleeve 17a connects with two horizontal equilibrium pipe portions 17. The horizontal equilibrium pipes 17 are preferably connected to the sleeve 17a by a "T" fitting 23. In this way, gas may pass from the rotor surface 18 through the sleeve 17a and out through the equilibrium pipes 17, thus making the sleeve and equilibrium pipes "pressure connected" to one another. As shown, the outer cylinder 15 has an opening 19 extending through the outer cylinder 15, thereby creating an outer entry point 20 in the outer cylinder 15. The opening 19 and sleeve 17a thus create a substantially linear passageway, generally 21, which passageway extends from the outer entry point 20 through the outer cylinder 15 and through the inner cylinder 14 to the outer surface 18 of the rotor 10. The sleeve 17a need not extend all the way to the rotor 10, provided the passageway 21 extends to the rotor 10 as shown. The passageway 21 as illustrated in FIG. 3 extends to the center plane 11 of the rotor 10. The substantially linear passageway 21 permits direct access to the center plane balance through the sleeve 17a.

In the present invention, the sleeve 17a is a pressure-connected extension of the equilibrium pipe 17, and the sleeve is aligned with the center plane balance 11. By using the sleeve in this way as the access to the center plane balance, only one plug 22 is required, as illustrated in FIG. 3, because there is no need to segregate pressure compartments. As shown, the plug 22 is positioned within the "T" fitting 23, which doubles as a plug housing. The plug 22 permits the equilibrium pipes 17 to perform their function of equalizing pressure during operation of the turbine 10, and also prevents any gas contained within the pipes 17 and passageway 21 from leaking through the outer cylinder 15. During operation of the rotor 10, the plug 22 is retained within the "T" fitting, or plug housing 23, which is adapted so that the plug 22 may be removed for performing the center plane balancing.

The plug 22 and fitting 23 are shown in greater detail in FIG. 4. As shown, the equilibrium pipes 17 comprise two parallel arms which are pressure connected to the sleeve 17a by the plug housing 23. The equilibrium pipes 17 extend horizontally from either side of the plug housing 23 as shown in FIG. 4a.

In the embodiment illustrated in FIG. 4, the plug housing 23 is a "T" fitting into which the plug 22 is inserted. The plug 22 may be a threaded bolt which is turned into the housing 23 thereby sealing the top portion of the sleeve 17b such that gas is prevented from leaking through the outer entry point 20, yet is allowed to pass through the sleeve 17b and equilibrium pipes 17.

As illustrated in FIG. 4, the sleeve 17a includes a skirt, 17c, which permits differential expansion of the sleeve relative to the large inner cylinder 14 at operating temperatures. The skirt 17c is attached to the cylinder 14, as by welding, thereby securing the sleeve 17a thereto, as illustrated in FIG. 3.

The present invention further preferably includes a cap 24, which cap covers the plug 22 at the outer entry point 20. The cap 24 may be a flange which is seated over the plug 22 as illustrated. As illustrated in FIG. 3, the plug 22 preferably has a hex fitting which extends above the outer surface 15a of the cylinder 15, thereby permitting easy removal of the plug 22.

To balance the rotor 10, the cap 24 is removed, thereby opening the outer entry point 20 in the exterior surface 15a of the outer cylinder 15. Next, the plug 22 is removed from the plug housing 23, for example, by using a wrench to unturn the bolt comprising the plug 22 from the plug housing 23, as illustrated in FIG. 4. Once the plug 22 is removed, this opens the passageway 21 from the outer entry point 20 through the sleeve 17a directly to the rotor 10. After the passageway 21 is opened, a balancing weight 25 having a predetermined mass is passed through the outer entry point 20 and through the passageway 21 into the rotor 10. The required mass of the weight is determined according to known methods. The balancing weight 25 is secured within the rotor, for example, by using a T-handle device with a screw plug that allows the weight to be passed through the passageway 21 and screwed into the rotor 10, at which time the T-handle device is removed. After the balancing weight 25 is secured, the plug 22 is replaced within the plug housing 23, as by threading the plug back into the threads in the housing, and the cap 24 is replaced, thereby covering the equilibrium tube 17.

As illustrated in FIG. 3, the weight 25 is secured within the rotor 10 so as to improve the balance of the center plane 11 of the rotor 10.

Although the invention has been described in detail in the foregoing for the purpose of illustration, it is to be understood that such detail is solely for that purpose and that variations can be made therein by those skilled in the art without departing from the spirit and scope of the invention as described by the following claims.

I claim:

1. A method for improving balance of a turbine rotor comprising the steps of:
   a. unplugging a sleeve, which sleeve extends substantially from said rotor through an outer housing which houses said rotor, by removing a plug retained in said sleeve, thereby opening an outer entry point in said outer housing and thereby opening a passageway extending from the outer entry point through said sleeve to said rotor, said sleeve being connected to an equilibrium pipe;
   b. passing a weight having a predetermined mass through said outer entry point and through said passageway into said rotor;
   c. securing said weight within said rotor thereby improving the balance of said rotor;
   d. replacing said plug within said equilbrium tube.

2. The method of claim 1 wherein said weight is secured within said rotor so as to improve the balance of a center plane of said rotor.

3. The method of claim 1 wherein said plug is removed from a plug housing, said plug housing retaining said plug within said sleeve during operation of said rotor.

4. An apparatus for improving the balance of a turbine rotor having an outer surface, said turbine motor being housed within an inner cylinder, said inner cylinder being housed within an outer housing, said inner cylinder and outer housing having a gap therebetween, said apparatus comprising a sleeve having a top portion, said sleeve extending substantially from said rotor outer surface through said inner cylinder and to said outer housing, said outer housing having an outer entry point therein, such that a passageway exists, said passageway extending from said outer entry point through said outer housing through said sleeve to said rotor, said passage permitting passage of balancing weights therethrough for placement within said rotor, said sleeve including an equilibrium pipe extending from said sleeve along said gap, said sleeve and said pipe being connected with each other, said sleeve further including a plug positioned within said sleeve, said plug sealing said top portion of said sleeve, thereby permitting said sleeve and said equilibrium pipe to equalize pressures in said turbine during operation of said turbine, and said plug preventing any gas contained within said sleeve and said equilibrium pipe from leaking through said outer housing.

5. The apparatus of claim 4 wherein said sleeve further includes a plug housing, said plug housing connecting said equilibrium pipe to said sleeve and retaining said plug within said sleeve, enabling said plug to be removed from said sleeve.

6. The apparatus of claim 4 wherein said turbine rotor has a center plane, and said passageway accesses said center plane, thereby permitting said center plane to be balanced by securing a balancing weight thereto.

7. The apparatus of claim 4 wherein said apparatus further includes a cap covering said passageway and said plug at said outer entry point.

* * * * *